March 21, 1961 R. A. WATERS 2,976,508
RECTILINEAR POTENTIOMETER
Filed Oct. 30, 1958
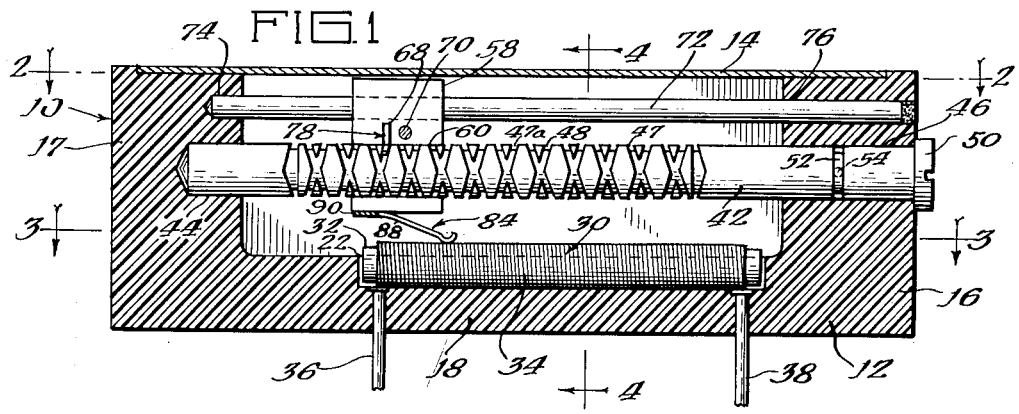
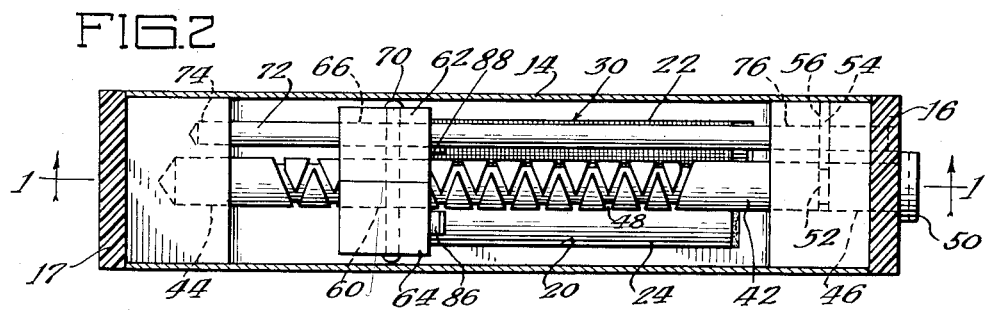
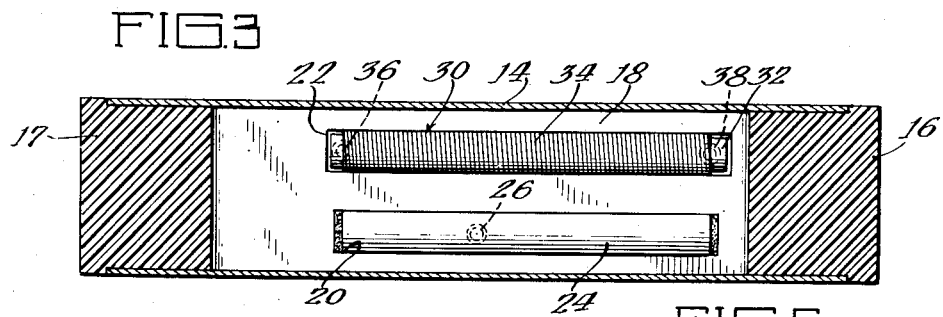
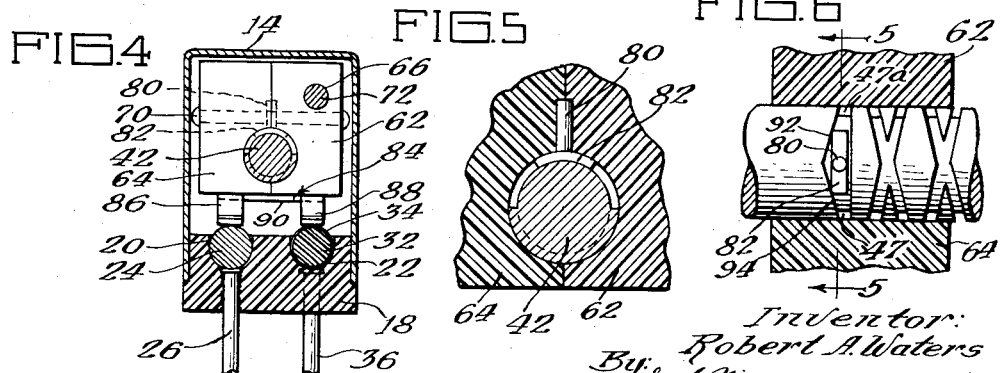
Inventor:
Robert A. Waters
By Graf, Nieman & Burmeister
Attorneys

United States Patent Office 2,976,508
Patented Mar. 21, 1961

2,976,508

RECTILINEAR POTENTIOMETER

Robert A. Waters, Weston, Mass., assignor to Waters Manufacturing, Inc., Wayland, Mass., a corporation of Massachusetts Filed Oct. 30, 1958, Ser. No. 770,809

1 Claim. (Cl. 338—180)

This invention relates to an improved construction for a rectilinear potentiometer.

Because of their compactness and efficiency of space utilization, rectilinear potentiometers are used in many applications as trimmers for "touching up" electronic circuits in which resistance values must be critically exact. The use of rectilinear, rather than rotary, potentiometers, however, has heretofore been accompanied by certain disadvantages. In general, the rectilinear potentiometers in use for such purposes consist of a linear resistance element along which the wiper or movable contact is driven by suitable coupling to a rotary control member, such as a screw. Since such potentiometers are desirably small, and accordingly delicate, and generally have no exterior indicator of the position of the wiper, it has been found that great care is required to prevent damage to the structure due to the application of force to the control member after the wiper has reached either of its intended limits of motion. Furthermore, where a potentiometer is employed as a trimmer in conditions where the trimmer may be so far out of adjustment that circuit performance does not constitute a ready indicator of the direction in which optimum adjustment lies, it has been observed that a technician or other person adjusting the trimmer may frequently run the trimmer all the way to one end, only to find that adjustment has not been accomplished in this range so that it is necessary to then run the trimmer all the way to the opposite end portion, in which the proper adjustment may lie. Similarly, the constructions heretofore employed for rectilinear potentiometers have rendered them, in general, completely unsuitable in applications where a potentiometer is to be driven by a mechanical device such as a motor.

It is the purpose of the present invention to provide a construction for rectilinear potentiometers eliminating the above disadvantages which have existed in previous constructions, thus enabling the obtaining of the advantages of rectilinear potentiometers in many uses and applications in which they could not heretofore practically be used, and also eliminating difficulties encountered in many present uses of such potentiometers.

This general aim or object is achieved by the provision of structures wherein means are provided to reverse the direction of travel of the contact along the linear resistance element when the contact reaches the end of its path, thus imparting a reciprocatory motion to the contact by continuous rotation of the rotary drive member. With this structure, the necessity of care to avoid damage to the potentiometer when it reaches the end of its path of travel is eliminated, as is the problem of determining the direction in which adjustment should be made, since any point of contact is reached by rotation from either direction. Further, the rectilinear potentiometer of the invention is adapted for mechanical operation, for example by a unidirectional motor.

For understanding of one advantageous detailed construction embodying this general structural feature, reference is made to the embodiment illustrated in the drawing, in which:

Figure 1 is a longitudinal sectional view of a potentiometer embodying the present invention, taken along the line 1—1 of Figure 2;

Figure 2 is a plan sectional view of the potentiometer shown in Figure 1;

Figure 3 is a partial cross-sectional view taken along the line 3—3 of Figure 1;

Figure 4 is a partial cross-sectional view taken along the line 4—4 of Figure 1;

Figure 5 is an enlarged cross-sectional view taken along the line 5—5 of Figure 6; and Figure 6 is an enlarged view of one end of the cylindrical cam shown in Figure 1 with the follower block in cross-sectional view and the follower shown in extreme end position.

Referring now to the drawings and more particularly to Figure 1, a continuous rectilinear potentiometer is generally indicated by numeral 10. The potentiometer 10 includes a base 12 and a cover 14. The base 12 is made of a suitable insulating material such as a phenolic resin and includes a pair of upstanding end arms 16 and 17, connected by a cross member 18 integral therewith.

The cross member 18 has in its upper surface a wiper bus indentation 20 and a resistance element indentation 22. A wiper bus 24 is positioned in the indentation 20 and consists of a conductor rod which has a lead 26 soldered thereto. The lead 26 extends through the cross member 18 to provide an exterior electrical terminal for the wiper bus 24. The lead 26 is secured in the cross member 18 by a suitable resin cement.

A resistance element 30, which includes an insulating core 32 and a resistance wire 34 wound on the core, is positioned in indentation 22 parallel to the wiper bus. One end of the resistance wire 34 is soldered to a resistance lead 36 and the other end of the wire is soldered to a second resistance lead 38, the resistance leads 36 and 38 extending through the cross member 18 and being secured therein in the same manner as the lead 26.

A cylindrical cam 42 is rotatably mounted in the opposed upstanding arms 16 and 17 parallel to the resistance element. One arm 17 has a receiver bore 44 extending therein and the other arm 16 has a cam aperture 46 extending through the arm and coaxial with the opening 44. The cylindrical cam 42 extends through the aperture 46 and into the opening 44. The cam 42 has a right hand helical groove 47 and a left hand helical groove 47a. The right and left hand helical grooves have the same pitch and originate and terminate at the same respective points to form, in essence, a single continuous reciprocatory follower groove 48 on the outer surface of the cam 42. The end of the cam 42 in the arm 16 has a slotted screw head 50. An annular groove 52 is cut in the cam body proximate to the screw head 50. A stop pin 54 is fixed in arm 16, which arm contains a stop pin hole 56. The stop pin 54 extends into the groove 52 so that the cylindrical cam 42 is fixedly mounted for rotation in the arms.

A two-piece follower block 58 has a cylindrical cam opening 60 through which the cam 42 extends. The follower block 58 includes a right half 62 and a left half 64. The right half 62 includes a guide rod aperture 66, and the two halves define a follower receiver bore 68. The two halves are held together by a rivet 70. A guide rod 72 extends between the arms parallel to the cam 42. The guide rod extends through the guide rod opening 66 and aperture 76 in arm 16 and is positioned in a blind guide rod opening 74 in arm 17. It is evident that the follower block 58 is prevented from rotating by the guide rod so that the follower block may move only parallel to the cam.

A follower 78 is pivotally mounted in the follower receiver bore 68 and is positioned in the groove 48. The follower 78 includes a cylindrical pin 80 which is positioned in follower receiver 68 and an arc follower arm 82 formed integral with the pin 80 on the end thereof. The arc arm 82, which is slidably positioned in groove 48, has a width slidably fitting the groove and is concentric with the cam 42. The length of the arm is greater than the openings in the groove at the intersections of the right hand and left hand helical grooves.

A bifurcated wiper contact 84 is affixed to the follower block 58. The bifurcated wiper contact 84 includes a bus arm 86, which electrically contacts the wiper bus 24, and a resistance arm 88, which electrically contacts the resistance element 30. The two arms are joined mechanically and electrically by a cross member 90.

The potentiometer 10 may be adjusted by turning the screw head 50 in one direction or the other. As the cylindrical cam rotates about its own axis it engages the arm 82 of follower 78, which arm moves within the groove 48 and in turn moves the follower block 58 and the bifurcated contact 84. When the follower 78 reaches the end of one of the grooves 47 or 47a which form the continuous reciprocatory follower groove 48, it enters the other groove and reverses its direction of motion as the screw 50 continues to rotate.

Looking now to Figure 6, it may be seen how the follower 78 leaves groove 47a and enters the groove 47 while the cam rotates about its axis. As the follower leaves the left hand groove, arm 82 is guided along the end wall 92. The arm 82 then engages end wall 94 so that the follower 78 pivots about its cylindrical pin 80 and enters into the right hand helical groove 47, thereby returning along the continuous follower groove 48 to impart the reciprocating movement to the bifurcated contact. In similar fashion, when the follower reaches the end of the groove at the other end of the cam, it returns to the left hand groove in the same manner.

It may be seen that the contact 84 is so positioned that the resistance arm 88 reaches one end of the resistance element 30 when the follower 78 reaches one end of the follower groove 48. When the follower reaches the other end of the groove 48, the resistance arm 88 reaches the other end of the resistance arm. Thus, there is a complete wipe of the entire resistance arm (but there is no danger that the screw head 50 will be turned too many times in one direction, to damage the potentiometer).

Although this invention has been described in terms of a potentiometer, it will be understood that this term as herein used includes a precision variable resistor. It will be obvious to those skilled in the art, after careful persual of the above description and examination of the annexed drawing, that many changes may be made without departing from the teachings of the invention, which may be incorporated in structures substantially differing in appearance and details of operation from that herein illustrated and described. As an obvious example, means other than the illustrated cam may be employed for reversing the direction of the wiper although the illustrated construction is particularly advantageous. Further, although in the illustrated embodiment the cam is of uniform pitch in each direction and the pitch is the same in both directions, variations wherein the pitch is varied in either or both directions, to produce non-linear resistance characteristics, will readily be seen. By such a modification, with the provision of a fixed center-tap, the device of the invention may readily be adapted for the production of sinusoidal voltages varying in both amplitude and polarity. Accordingly the scope of the invention shall not be deemed to be limited by the particular embodiment shown in the drawing but shall be determined by the annexed claim.

What is claimed is:

A potentiometer having a generally U-shaped base and an enclosing cover, said base including a pair of upstanding arms and a cross member connecting said arms, a longitudinally extending resistance element mounted on the cross member, a bus mounted on the cross member substantially parallel to the resistance element, a cylindrical cam supported by the arms substantially parallel to the resistance element, said cam having a continuous follower groove on the outer surface thereof, a follower block mounted on the cylindrical cam, a guide rod extending through said follower block, a follower pivotally mounted in the follower block and slidably engaging said cylindrical cam, and interconnected contacts electrically connecting the resistance element and the bus, whereby continuous rotation of the cylindrical cam in one direction moves the contact back and forth along the resistance element and the bus.

References Cited in the file of this patent

UNITED STATES PATENTS

| | | |
|---|---|---|
| 1,853,798 | Brownell | Apr. 12, 1932 |
| 2,777,926 | Bourns | Jan. 15, 1957 |